(12) United States Patent
Hoppel et al.

(10) Patent No.: US 10,868,435 B2
(45) Date of Patent: Dec. 15, 2020

(54) CHARGING STATION MOUNTED ON A POWERED DRIVEABLE MACHINE

(71) Applicant: Green Industry Innovators, L.L.C., Louisville, OH (US)

(72) Inventors: Steffon Hoppel, Louisville, OH (US); Todd Pugh, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 127 days.

(21) Appl. No.: 16/226,833

(22) Filed: Dec. 20, 2018

(65) Prior Publication Data
US 2019/0199120 A1 Jun. 27, 2019

Related U.S. Application Data

(60) Provisional application No. 62/610,682, filed on Dec. 27, 2017.

(51) Int. Cl.
| | | |
|---|---|---|
| H02J 7/00 | (2006.01) | |
| A01D 34/00 | (2006.01) | |
| A01D 43/00 | (2006.01) | |
| A01D 75/00 | (2006.01) | |
| H02J 7/14 | (2006.01) | |
| H02J 7/04 | (2006.01) | |
| A01D 34/78 | (2006.01) | |
| A01D 34/03 | (2006.01) | |
| A01D 43/16 | (2006.01) | |
| A01D 34/64 | (2006.01) | |

(Continued)

(52) U.S. Cl.
CPC .............. *H02J 7/14* (2013.01); *A01D 34/037* (2013.01); *A01D 34/64* (2013.01); *A01D 34/78* (2013.01); *A01D 43/16* (2013.01); *H02J 7/00041* (2020.01); *H02J 7/0045* (2013.01); *H02J 7/0063* (2013.01); *H02J 7/04* (2013.01); *H02J 7/1423* (2013.01); *A01D 34/001* (2013.01); *A01D 75/008* (2013.01); *A01D 2101/00* (2013.01); *H02K 21/222* (2013.01)

(58) Field of Classification Search
None
See application file for complete search history.

(56) References Cited

U.S. PATENT DOCUMENTS

| | | | | |
|---|---|---|---|---|
| 4,870,811 A | * | 10/1989 | Steele ................. | A01D 34/001 56/10.5 |
| 5,802,824 A | * | 9/1998 | Aldrich ............... | A01D 34/001 56/12.7 |

(Continued)

FOREIGN PATENT DOCUMENTS

WO 2019071237 4/2019

*Primary Examiner* — Leigh M Garbowski
(74) *Attorney, Agent, or Firm* — Sand, Sebolt & Wernow Co., LPA

(57) ABSTRACT

A mower having a supplemental battery charging station mounted thereon is provided. The mower utilizes a flywheel/alternator arrangement to output a selected voltage. The voltage is directed to the supplement battery charging station. The supplemental batteries are thereby charged at the charging station as the mower is driven forward or in another direction. The lawn mower also includes a rack (which may be in the form of a hook) to carry a battery powered supplemental lawn maintenance tool, such as a weed trimmer, hedger, edger, or leaf blower, amongst others.

19 Claims, 6 Drawing Sheets

(51) Int. Cl.
*H02K 21/22* (2006.01)
*A01D 101/00* (2006.01)

(56) References Cited

U.S. PATENT DOCUMENTS

| | | | | |
|---|---|---|---|---|
| 5,809,758 A * | 9/1998 | Flanigan | ............... | A01D 34/001 56/13.7 |
| 6,032,443 A * | 3/2000 | Aldrich | ................ | A01D 34/001 30/276 |
| 6,409,029 B1 * | 6/2002 | Bermes | ................ | A01D 75/004 211/207 |
| 6,619,485 B1 * | 9/2003 | Jenkins | ................... | E05B 73/00 211/4 |
| 6,986,238 B1 * | 1/2006 | Bloodworth | ............ | A01D 34/82 56/12.7 |
| 7,644,846 B2 * | 1/2010 | Hafendorfer | ............. | B60P 3/14 211/60.1 |
| 9,511,659 B2 * | 12/2016 | Young | ....................... | B60K 6/46 |
| 10,098,278 B2 * | 10/2018 | Velderman | ............. | A01D 34/64 |
| 10,791,669 B2 * | 10/2020 | Dretzka | .................. | B60R 11/06 |
| 2006/0207235 A1 * | 9/2006 | Izatt | ....................... | A01D 43/16 56/13.7 |
| 2007/0237491 A1 * | 10/2007 | Kraft | ........................ | H04N 9/87 386/230 |
| 2017/0122325 A1 | 5/2017 | Seman et al. | | |
| 2018/0206401 A1 * | 7/2018 | Simmons | ............... | A01D 69/02 |
| 2019/0066495 A1 | 2/2019 | Elsheemy | | |
| 2019/0075726 A1 | 3/2019 | White et al. | | |
| 2019/0191624 A1 | 6/2019 | Hoppel et al. | | |
| 2019/0191787 A1 | 6/2019 | Hoppel et al. | | |
| 2019/0208836 A1 | 7/2019 | Demers et al. | | |
| 2019/0229580 A1 | 7/2019 | Edwards et al. | | |
| 2019/0238083 A1 | 8/2019 | White et al. | | |
| 2019/0247995 A1 | 8/2019 | Hocine et al. | | |
| 2019/0260210 A1 | 8/2019 | Peloquin, Jr. et al. | | |
| 2019/0289929 A1 | 9/2019 | Bessette et al. | | |
| 2019/0299882 A1 | 10/2019 | Lecointre et al. | | |
| 2019/0300035 A1 | 10/2019 | Colton et al. | | |
| 2019/0337548 A1 | 11/2019 | Colton et al. | | |
| 2019/0359198 A1 | 11/2019 | Velderman et al. | | |

\* cited by examiner

CHARGING STATION MOUNTED ON A POWERED DRIVEABLE MACHINE

CROSS REFERENCE TO RELATED APPLICATION

This application claims the benefit of U.S. Provisional Application Ser. No. 62/610,682, filed on Dec. 27, 2017; the disclosure of which is incorporated herein by reference.

TECHNICAL FIELD

The present disclosure relates generally to outdoor power units, such as lawn mowers (or snow blowers/throwers) and supplemental lawn maintenance tools. More particularly, the present disclosure relates to an outdoor power unit or mower that includes a supplemental battery charging station and a rack supporting a battery powered lawn maintenance tool such as a weed trimmer, an edger, a leaf blower, or a hedge trimmer.

BACKGROUND

Background Information

Outdoor yard maintenance and lawn care may be accomplished in a number of different ways. Some people choose mowers or other zero turn standing mowers to accomplish their yard mowing tasks. Ordinarily, mowers have a gas combustion engine supported by a frame and an alternator connected thereto. The alternator on the mower is utilized to output an electrical current ordinarily used to a charge a conventional battery that is supported by the mower and is not configured to be removed from the mower unless the battery needs replaced.

In addition to mowers, there are other supplemental tools such as weed trimmers, hedge trimmers, edgers, and leaf blowers that may be used in conjunction with mowers to accomplish more precise lawn care maintenance.

With respect to the supplemental tools such as hedge trimmers, weed trimmers, and leaf blowers, these come in a variety of shapes and power outputs. Some of these supplemental tools utilize a gas combustion engine while others use rechargeable batteries that may be either 12 volt, 16 volt, 18 volt, 20 volt, 24 volt, or even as high as 48 volts.

These lawn maintenance and lawn care tools prove useful for homeowners, especially those who have significant amounts of property, such as a field that needs mowed and maintained. Sometimes these fields have fence lines which prevent the mower from coming within a certain distance of the fence line. Thus, a supplemental tool, such as a weed trimmer, can trim around the fence posts to clean and maintain the lawn in the area adjacent the fence post that the mower is unable to reach.

SUMMARY

Issues to continue to exist for homeowners and other lawn care maintenance professionals while maintaining significant areas in that the mower or other outdoor power unit may be driven a far distance to maintain and cut grass but the operator could be remote and far away from their supplemental tools in order to trim a fence line far away from their garage or, in the case of a lawn maintenance professional, their transportable trailer. Thus, a need continues to exist for a device that enables mowers to carry a supplemental tool thereon while simultaneously recharging a supplemental battery configured to power the supplemental tool. The present disclosure addresses these and other issues.

In accordance with one aspect, an exemplary embodiment of the present disclosure may provide a powered drivable machine comprising: an engine or motor supported by a frame; a main battery coupled to the engine or motor; a supplemental battery base supported by the frame and defining at least one slot sized to receive a portion of a rechargeable supplemental battery that powers a supplemental tool when removed from the supplemental battery base and connected with the supplemental tool; and a terminal disposed within the at least one slot that draws electrical power from one of the (i) engine or motor and (ii) the main battery to recharge the rechargeable supplemental battery when the portion of the rechargeable supplemental battery is connected with the terminal. This exemplary embodiment or another exemplary embodiment may further provide wherein the supplemental battery base is open to the environment. This exemplary embodiment or another exemplary embodiment may further provide wherein the supplemental battery base is not enclosed within a cabin. This exemplary embodiment or another exemplary embodiment may further provide wherein the supplemental battery base includes: at least two slots, wherein each slot is sized to receive a complementary extension of one rechargeable supplemental battery. This exemplary embodiment or another exemplary embodiment may further provide a cover for the supplemental battery base that is moveable between an open position and a closed position adapted to protect a portion of the supplemental battery base that is open to the environment. This exemplary embodiment or another exemplary embodiment may further provide wherein when the cover is in the open position, the rechargeable supplemental battery mateably engages the supplemental battery base, and when the supplemental battery disengages the supplemental battery base the cover is configured to move from the open position towards the closed position. This exemplary embodiment or another exemplary embodiment may further provide wherein the engine or motor is an internal combustion engine supported by the frame, further comprising: an alternator coupled to the engine that generates electrical current and sends the electrical current towards the terminal. This exemplary embodiment or another exemplary embodiment may further provide a transformer in electrical communication with the terminal and the alternator to transform the electrical current from a first voltage to a second voltage prior to exiting the terminal. This exemplary embodiment or another exemplary embodiment may further provide wherein the alternator includes a flywheel attached to a magnetic rotor and wherein the alternator further includes a repeatably interchangeable stator including coils in operative communication with the magnetic rotor attached to the flywheel and configured to direct electrical current output from the alternator, wherein the electrical current output depends on the coil configuration and is selected from the group comprising: 12 Volt (V), 16V, 18V, 20V, 48V. This exemplary embodiment or another exemplary embodiment may further provide wherein the engine or motor is an electric motor supported by the frame, further comprising: a transformer in electrical communication with the terminal and the main battery to transform the electrical current from a first voltage to a second voltage prior to exiting the terminal. This exemplary embodiment or another exemplary embodiment may further provide a rack indirectly coupled to the frame configured to repeatably and releasably support a battery powered supplemental tool. This exemplary embodiment or another exemplary embodiment may further provide a panel positioned above the frame; wherein the rack is attached to the panel. This exemplary embodiment or another exemplary embodiment may further provide wherein the rack attached to the panel is positioned adjacent drive controls of the powered drivable machine to enable an operator or driver to reach both the drive controls and the rechargeable supplemental battery without dismounting from an operator support. This exemplary embodiment or another exemplary embodiment may further provide wherein the rack is positioned at a greater height than the supplemental battery pack base. This exemplary embodiment or another exemplary embodiment may further provide wherein the rack includes a hook supporting the supplemental tool in a hanging manner that orients a length of the supplemental tool in the longitudinal direction of the machine.

In another aspect, an exemplary embodiment of the present disclosure may provide a battery powered drivable machine comprising: a forward end and a rear end defining a longitudinal direction therebetween, and a first side and a second side defining a transverse direction therebetween, and a upper end and a lower end defining a vertical direction therebetween; a frame; an electric motor supported by a frame; a main battery coupled to the electric motor; ground engaging drive wheels coupled to the frame and configured to support the frame from below; drive controls that are open to the environment in operative communication with the ground engaging drive wheels to move the battery powered driveable machine in different directions; a supplemental battery base supported by the frame and defining at least one slot sized to receive a portion of a rechargeable supplemental battery that powers a supplemental tool when removed from the supplemental battery base and connected with the supplemental tool; a terminal disposed within the at least one slot that draws electrical power from one of the (i) the electric motor and (ii) the main battery to recharge the rechargeable supplemental battery when the portion of the rechargeable supplemental battery is connected with the terminal; and a support member sized to carry the supplemental tool that is powered by the rechargeable supplemental battery, wherein the supplemental tool may be selectively and repeatedly connected and disconnected to the rack. This exemplary embodiment or another exemplary embodiment may further provide wherein the support member supports the supplemental tool and positions a maximum dimension associated the supplemental tool along the longitudinal direction of the battery powered driveable machine. This exemplary embodiment or another exemplary embodiment may further provide wherein the support member supports the supplemental tool and enables the tool to be repeatedly connected and disconnected from the support member, wherein a center of gravity of the powered driveable machine changes by no more than about 5% while the supplemental tool is connected and disconnected from the support member. This exemplary embodiment or another exemplary embodiment may further provide wherein the support member is vertically above the supplemental battery base. This exemplary embodiment or another exemplary embodiment may further provide at least two rechargeable supplemental batteries; a battery charging first mode of each supplemental battery when the supplemental battery is selectively connected with the supplemental battery base; a battery depleting second mode of each supplemental battery when the supplemental battery is disconnected from the supplemental battery base and connected with the supplemental tool that is removed from the rack; wherein when one supplemental battery is in the depleting second mode, the other battery is in the charging first mode connected to the supplemental battery base.

In yet another aspect, an exemplary embodiment of the present disclosure may provide a method comprising: transferring electrical power from a power source on a powered drivable machine to a terminal in a battery pack base on the powered drivable machine; charging a supplemental battery connected to the terminal in the battery pack based; carrying a supplemental tool configured to be powered by the supplemental battery when the supplemental tool is configured to be removed from a support on the powered drivable machine; wherein at least one of the supplemental tool and battery pack base is open to the environment. This exemplary embodiment or another exemplary embodiment may further provide transforming the electrical power from a first voltage to a lesser second voltage prior to charging the supplemental battery. This exemplary embodiment or another exemplary embodiment may further provide maintaining the electrical power within 10% of a output voltage of the power source at the terminal to charge the supplemental battery. This exemplary embodiment or another exemplary embodiment may further provide carrying the supplemental tool at a location on the powered drivable machine that effects the center of gravity of the machine by less than 5% when the supplemental tool is connected and disconnected from the support on the powered drivable machine. This exemplary embodiment or another exemplary embodiment may further provide maintaining electrical power at the terminal after the supplemental battery has been removed to enable automatic charging of the supplemental battery when the supplement battery is re-connected to the battery pack base after having been removed and used with a supplemental tool; This exemplary embodiment or another exemplary embodiment may further provide generating electrical power from a main battery coupled to an electric motor on powered drivable machine. This exemplary embodiment or another exemplary embodiment may further provide generating electrical power from an alternator coupled to an internal combustion engine on the powered drivable machine. This exemplary embodiment or another exemplary embodiment may further provide rotating ground engaging wheels and simultaneously charging the supplemental battery.

In yet another aspect, an exemplary embodiment of the present disclosure may provide a method comprising: removing a supplemental battery from a battery pack base on a powered drivable machine; connecting the supplemental battery to a supplemental tool; powering the supplemental tool with the supplemental battery to deplete an electrical charge of the supplemental battery; disconnecting the supplemental battery from the supplemental tool; and connecting the supplemental battery to the battery pack base to recharge the supplemental battery. This exemplary embodiment or another exemplary embodiment may further provide driving the powered drivable machine from a first location to a second location; releasing control of drive controls of the powered drivable machine; grasping the supplemental tool and connecting the supplemental battery to the supplemental tool after removing the supplemental battery from the battery pack base. This exemplary embodiment or another exemplary embodiment may further provide performing a secondary action with the secondary tool remote from the powered drivable machine; completing, at least a portion of, the secondary action and then disconnecting the supplemental battery from the supplemental tool; and recharging the supplemental battery in the battery pack base after having been at least partially depleted. This exemplary embodiment or another exemplary embodiment may further provide wherein the powered drivable machine is a zero-turn mower; driving the zero-turn mower and mowing grass while driving the zero-turn mower; driving the zero-turn mower near a fence line and being unable to mow around individual fence posts; dismounting the zero-turn mower; wherein the supplemental tool is a string trimmer; disconnecting the string trimmer from a rack on the zero-turn mower; removing one supplemental battery from the battery pack base and connecting the supplemental battery to the string trimmer; trimming grass around the fence post; and removing the supplemental battery from the string trimmer and connecting the battery back with the battery pack case to recharge the supplemental battery. This exemplary embodiment or another exemplary embodiment may further provide removing the supplemental tool from a connection with the powered drivable machine without altering a center of gravity of the machine by more than 5%. This exemplary embodiment or another exemplary embodiment may further provide charging the supplemental battery while moving the powered drivable machine.

In accordance with one aspect, the present disclosure may provide a lawn mower having a supplemental battery charging station mounted. The lawn mower utilizes a flywheel/alternator arrangement to output a selected voltage. The voltage is directed to the supplement battery charging station. The supplemental batteries are thereby charged at the charging station as the lawn mower is driven forward or in another direction. The lawn mower also includes a rack (which may be in the form of a hook) to carry a battery powered supplemental lawn maintenance tool, such as a weed trimmer, hedger, edger, or leaf blower, amongst others.

In accordance with one exemplary embodiment, a mower may include: an engine supported by a frame including a forward end and a rear end defining a longitudinal direction therebetween and a first side opposite a second side defining a transverse direction therebetween; an operator support supported by the frame; mower drive controls adjacent the operator support configured to control a set of ground engaging drive wheels; a mower deck housing a rotatable blade operatively connected to the engine; an alternator operatively connected to the engine and indirectly supported by the frame intermediate the forward end and the rear end, wherein the alternator outputs an electrical direct current (DC); wherein the alternator includes a flywheel attached to a magnetic rotor; wherein the alternator further includes a repeatably interchangeable stator including wound conductive coils in operative communication with the magnetic rotor attached to the flywheel and configured to direct the electrical current output from the alternator, wherein the electrical current output depends on the wound coil configuration and is selected from the group comprising: 12 V, 16V, 18V, 20V, 48V; a battery pack base indirectly supported by the frame and the base defining at least one slot sized to receive a portion of a rechargeable DC battery; a battery recharging terminal disposed within the slot, wherein the terminal is operatively connected to the alternator; and a rack indirectly coupled to the frame configured to support a DC battery powered tool repeatably and releasably supported by the rack.

In accordance with another exemplary embodiment, a method may include the steps of: powering an alternator with an engine supported by a mower frame; charging a repeatably removable supplemental battery in a battery pack base supported by the mower frame, wherein the supplement battery configured to power a distinct battery powered tool when the supplemental battery is removed from the battery pack base; separating the distinct battery powered tool from a rack indirectly supported by the mower frame; removing the supplemental battery from the battery pack base; connecting the supplemental battery to the distinct battery powered tool; actuating an element on the distinct battery powered tool with an electrical charge from the supplemental battery; removing the supplemental battery from the distinct battery powered tool; reconnecting the supplemental battery to the battery pack base; recharging the supplemental battery while supported by the battery pack base; and attaching the battery powered tool to the rack.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
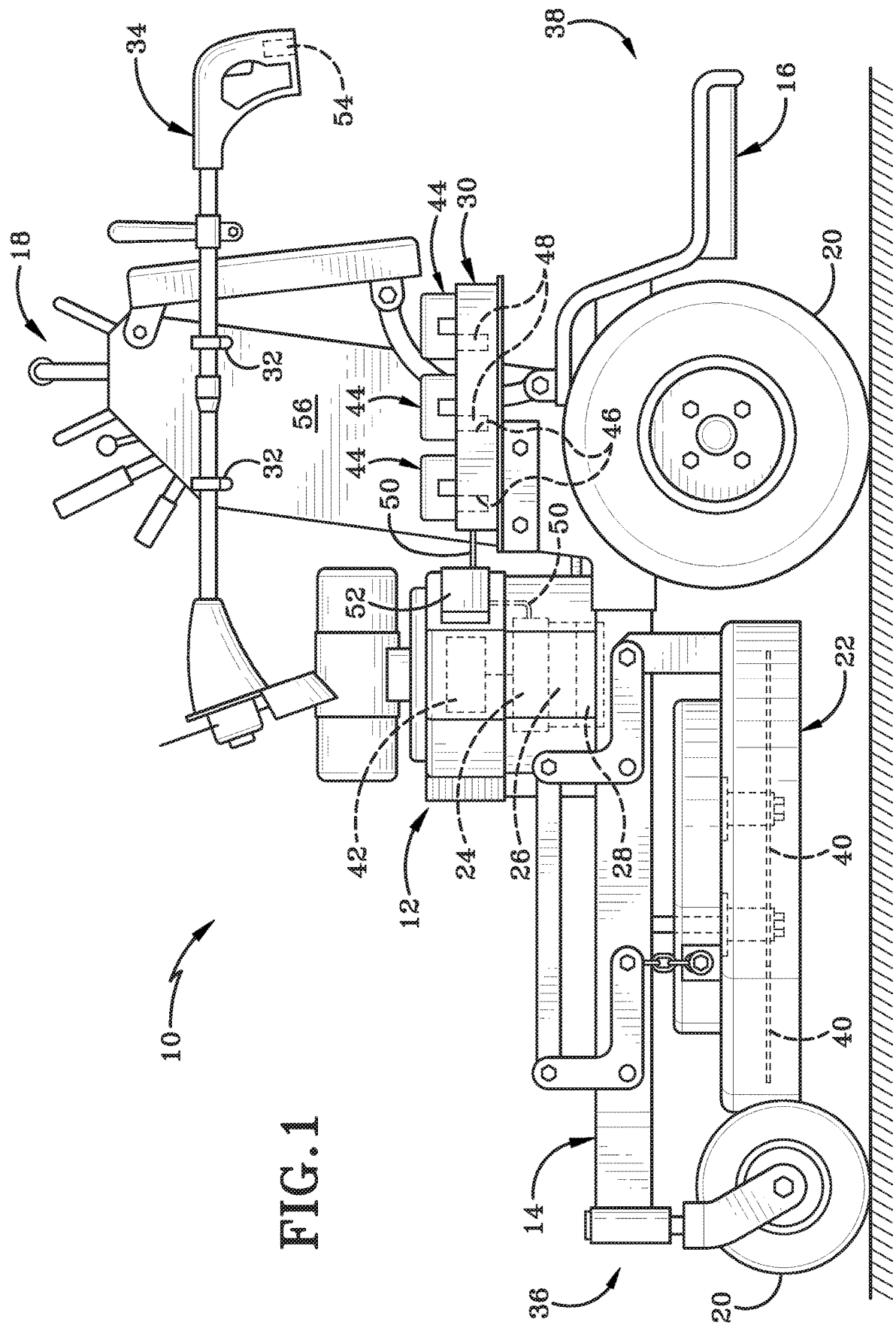
FIG. 1 is a side elevation view of an exemplary mower in accordance with the present disclosure including a flywheel-type alternator and a supplemental battery charging assembly and a supplemental battery powered tool supported by a rack.

As depicted throughout the figures, an outdoor power unit or power drivable machine is depicted generally at 10. In one embodiment, the power drivable machine 10 is a zero turn mower, which is also denoted as mower 10. Mower 10 is configured to carry an operator and a battery powered hand tool on a rack attached to the mower 10 and enable the operator to remove the battery powered tool to perform a supplemental task remote from the mower 10. However, the powered drivable machine may be a snow blower or other outdoor power unit as one having ordinarily skill in the art understands.

Mower 10 may include an engine 12, a mower frame 14, an operator support 16, mower drive controls 18, ground engaging wheels 20, a mower deck 22, an alternator 24, a flywheel 26, a stator 28, a battery pack base 30, and a rack 32 configured to support a battery powered tool 34 that is repeatably and releasably supported by the rack 32. In one example, mower 10 may be a zero turn mower, which is also denoted as mower 10.

Mower 10 includes a forward end 36 and a rear end 38 defining a longitudinal direction therebetween. Similarly, mower 10 includes a first side and second side defining a transverse direction therebetween. Additionally, mower 10 includes a lower end defined by the ground engaging wheels 20 and an upper end defined by the mower drive controls 18 that define a vertical direction therebetween.

Engine 12 is supported by frame 14 and is coupled thereto as one having ordinary skill in the art would understand. Additionally, engine 12 may be positioned at any location intermediate the forward end 36 and the rear end 38. Further, engine 12 may be located at any position on mower 10 intermediate the first side and the second side. Additionally, engine 12 may be any conventionally known engine configured to power the mower 10. In one particular example, engine 12 may be an internal combustion engine. However, another exemplary embodiment, the engine 12 may be an electric mower with a drive shaft coupled to various wheels or pulley or other gears to effectuate rotational movement of components, such as the drive wheels 20, or the mower blades 40, on the mower 10. When engine 12 is embodied as an electric motor, the electric motor may have a larger battery source that is carried by the mower frame, at least indirectly, to power the electric motor. The electric motor battery may be rechargeable in a conventionally known manner to allow the mower or powered drivable machine 10 to deplete the main battery associated with the electric motor (i.e. engine 12) to perform the various actions and modes of operations in discussed in greater detail below.

Operator support 16 is attached to frame 14 in a rigid manner such that an operator is able to sit or stand with their body weight supported by operator support 16. Operator support 16 is depicted in FIG. 1 as a platform upon which an operator stands and in this scenario, mower 10 is a zero turn standup mower. However, operator support 16, as depicted in FIG. 1, is not intended to be limiting, and as one having ordinary skill in the art would understand and foresee, operator support 16 may be in the form of a seat positioned closely adjacent engine 12 supported by frame 14.

The mower drive controls 18 are located adjacent the operator support 16 in order to give the operator the ability to manually adjust various controls in order to move mower 10 in the desired direction. As one having ordinary skill in the art would understand, the drive controls 18 may be operatively connected and in logical communication with engine 12 which is in operative communication with ground engaging wheels 20. Thus, actuation of mower controls 18 can move mower 10 in the forward or rearward direction or toward the first side or toward the second side. Additionally, mower controls 18 may be operatively connected to mower deck 22 which includes a rotatable blade 40 as one having ordinary skill in the art would understand. Mower deck 22 is preferably positioned intermediate the wheels 20, however other scenarios may provide a situation where the mower deck 22 is forward from the forwardmost wheel or rearward from the rearmost wheel.

The alternator 24 is operatively connected to the engine 12 and indirectly supported by the frame 14 intermediate the forward end 36 and the rear end 38. As one having ordinary skill in the art would understand, alternator 24 is configured to output an electrical current. In the preferred embodiment of the present disclosure, the electrical current output from alternator 24 is a direct current. The direct current output from alternator 24 may be tied or coupled to a mower battery 42 configured to drive the electrical systems of mower 10 as one having ordinary skill in the art would understand. The mower battery is generally indicated at 42 and its position represented in FIG. 1 is not intended to be limiting and rather is shown pictorially to indicate that the mower battery 42 is configured to power the mower 10 and not supplemental tool 34. Thus, battery 42 may be considered a "main battery" for the machine or mower 10. As will be described in greater detail below, the battery pack base 30 supports a plurality of removable supplemental batteries 44 configured to power supplemental tool 34 when tool 34 is removed from rack 32, and these supplemental batteries 44 do not power mower 10 like mower battery 42 does. The alternator 24 may also include the flywheel 26 with a magnetic rotor fixedly attached thereto. The flywheel 26 enables alternator 24 to be a permanent magnetic-type flywheel alternator that has no brushes, no commutator, no belts, and requires little to no adjustments. The stator 28 includes a plurality of coils wound in series in order to create magnetic flux as the magnetic rotor on flywheel 26 rotates around or adjacent the stationary coils of stator 28. While not shown in FIG. 1, one having ordinary skill in the art would understand and foresee that the flywheel alternator as depicted would also include a rectifier module and a regulator module. Additionally, when machine 10 is embodied as a powered drivable machine powered by an electric motor, the battery 42 may be the main battery that powers the electric motor 12, which may require a different voltage than the supplemental batteries 44 electrically connected to base 30.

The direct current output from alternator 24 depends on the coil arrangement present in stator 28. Accordingly, and in accordance with the present disclosure, there may be advantages of producing different DC currents output from alternator 24. As such, stator 28 is designed to be repeatably releasable and interchangeable with other stators having similar mounts to operatively connect with flywheel 26 but have alternative coil arrangements. With the varying coil arrangements, the operator is able to selectively determine the electrical DC current output from alternator 24. In accordance with the present disclosure, the DC electrical current output from alternator 24 may be selected from a voltage group comprising 12 volts, 16 volts, 18 volts, 20 volts, and 48 volts. As the voltage is selective chosen, the output voltage from the power source (i.e., the alternator or the main battery in the case of an electrical motor-driven machine 10) may be maintained within about 10% of the output voltage of the power source at the terminal 48. For example, if the main battery of the electrically powered machine (i.e., an electric mower or an electric snow blower, etc.) is a 48V system, then the output voltage at the terminal for charging supplemental batteries 44 may be in a range from about 43V to about 53V (i.e., 48V+/−10%). Alternatively, if the main battery of the electrically powered machine (i.e., an electric mower or an electric snow blower, etc.) is a 20V system, then the output voltage at the terminal for charging supplemental batteries 44 may be in a range from about 18V to about 22V (i.e., 20V+/−10%).

The operator determines the amount of DC output voltage from alternator 24 based on the type of supplemental batteries 44 that need recharged in the battery pack base 30. For example, if the supplemental batteries are 18 volt, then the operator will selectively mount the stator 28 having a coil arrangement corresponding to an 18 volt output. Furthermore, inasmuch as the alternator outputs direct current (DC), mower 10 established a DC-to-DC battery charging action from the alternator 24 to the supplemental battery 44, and some implementations enables the mower 10 to be free of (i.e., does not have) a current converter.

Figure 2:
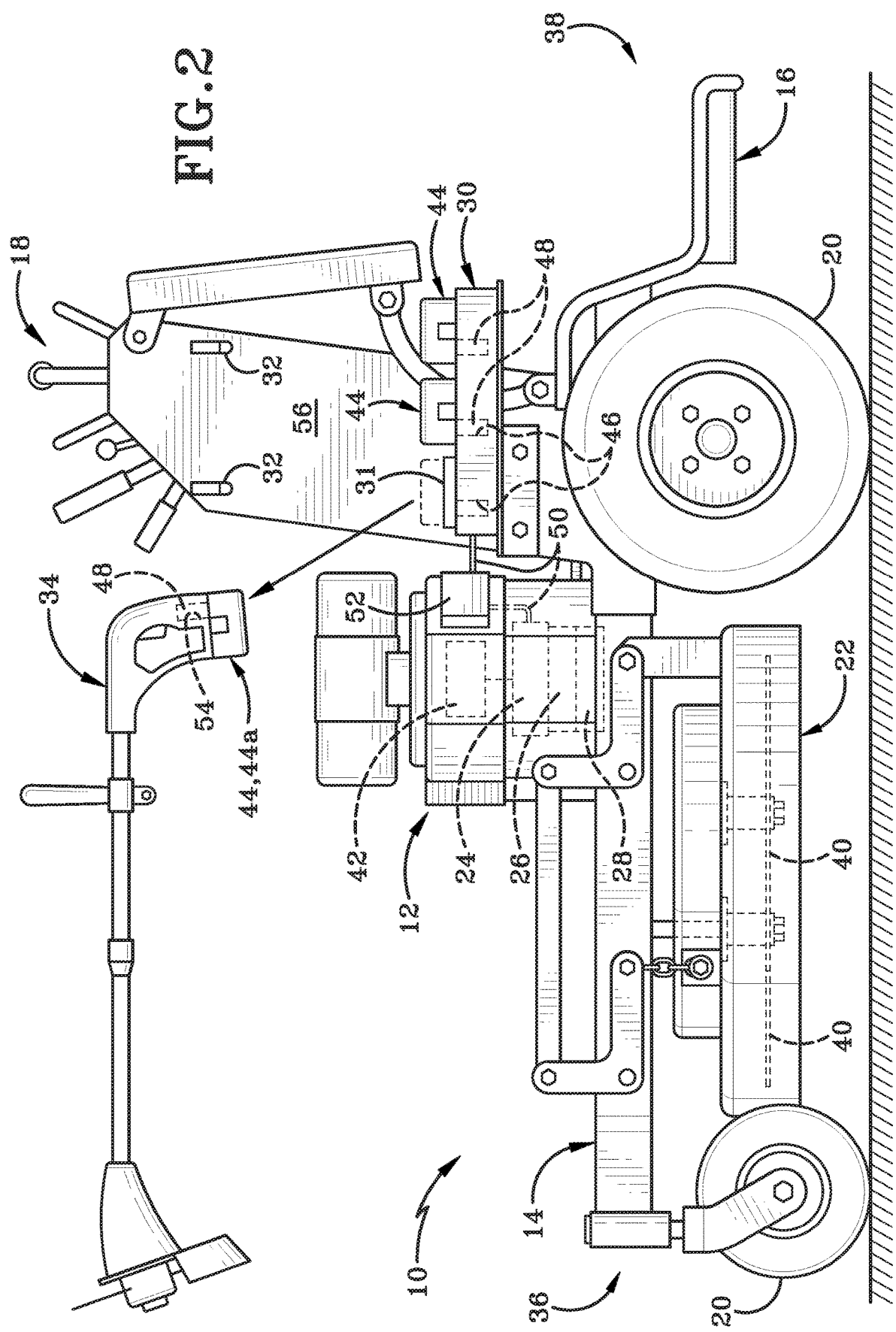
FIG. 2 is a side elevation view similar to that of FIG. 1 depicting the supplemental tool being removed from the rack and one of the supplemental batteries being inserted into the tool in order to electrically power the supplemental tool.

The battery pack base 30 houses a plurality of supplemental batteries 44. More particularly, base 30 is indirectly supported by frame 14 and defines a plurality of slots 46 therein configured to receive a complementary-shaped extension on the supplemental battery 44. In one particular embodiment, there are three slots 46, however, this is not intended to be limiting. For example, another embodiment only requires at least two slots. Each slot is sized to receive a complementary-shaped portion of one supplemental battery. For example, the supplemental batter 44 may include an extended portion that slidably engages the slot. An electric terminal 48 may be positioned near the bottom of the slot 46 that is electrically connected to alternator 24 through a line 50. Optionally, a current regulator 52 may be provided along line 50. Further, since base 30 may be open to the environment, base 30 may have or be connected with a cover 31 for the supplemental battery base 30 that is moveable between an open position and a closed position adapted to protect a portion of the supplemental battery base that is open to the environment. When the cover is in the open position, the rechargeable supplemental battery mateably engages the supplemental battery base, and when the supplemental battery disengages the supplemental battery base the cover is configured to move from the open position towards the closed position, as shown in FIG. 2.

Alternator 24 is configured to charge supplemental batteries 44 when they are housed in base 30 and electrically connected to terminals 48 in slot 46. Supplemental batteries 44 may be any conventionally known type such as lithium ion batteries utilized in electrically powered hand tools. In another embodiment, when machine 10 is powered by an electric motor driven by a main battery, the terminal 48 may draw power directly from the main battery of the machine 10 without the need for an alternator. Rather, the machine having an electric motor could utilize one or more regulators or transformers to ensure that the appropriate current or voltage transfers from the main battery of the electric machine 10 to the terminal 48 to draw power and charge the supplemental battery 44.

As such, tool 34 may be any known battery powered tool as one having ordinary skill in the art would understand. However, it is preferable that the supplemental tool 34 be utilized with lawn maintenance and other grass maintenance. Thus, while tool 34 is depicted generally as a weed trimmer, the supplemental tool 34 may also be a leaf blower, an edger, a hedge trimmer, or any other battery powered lawn maintenance and lawn care tool. In each instance, supplemental tool 34 defines a battery receptacle 54 that is sized similar to slot 46 in base 30 such that the extension portion of supplemental battery 44 can fit within receptacle 54 in order to electrically power tool 34 once removed from rack 32.

Rack 32 may be attached to a mower panel 56 in order to releasably support tool 34 thereon. In one particular embodiment, rack 32 may be closely adjacent mower controls 18 and positioned vertically below controls 18 and above engine 12. In other instances, rack 32 may be positioned rearwardly from engine 12. However, this is not intended to be limiting and there could be scenarios where rack 32 is positioned forwardly from engine 12. Rack 32 may be further positioned vertically above base 30 such that supplemental batteries 44 when being charged or recharged are positioned below a portion of supplemental tool 34. The panel 56 supporting rack 32 may be directly connected to frame 14, thus rack 32 may be referred to as indirectly coupled to frame 14. In one embodiment, rack 32 may be defined by a hook adapted to support supplemental tool 34 in a hanging manner. However, rack 32 does not need to be a hook. Rather, in other embodiments, rack 32 may include any type of support member that is sized to connect with tool 34 and carry/support the same. Further, as depicted in FIG. 1, rack 32 may be constructed in a manner that enables rack 32 to support the tool 34 in a way such that the maximum dimension (in the case of a weed trimmer of FIG. 1, its length) in the longitudinal direction from the front end 36 to the rear end 38. However, there may be other scenarios where the maximum dimension of the tool 34 (such as its length) would be oriented perpendicular to the longitudinal direction and parallel to the transverse direction (i.e., side-to-side) of the machine 10. Further, rack 32 may be positioned vertically above base 30, however, these positions may be varied depending on the size and shape of the tool 34 carried by rack 32. For example, it may be advantageous to position the tool 34 on rack 32 at a lower height relative to machine 10 when the tool 34 is heavy in order to lower or maintain a relatively low center of gravity for the machine 10. Yet, when tool 34 is relatively lightweight, it may be more beneficial to place the rack 32 at a greater vertical height to make it easier for the operator to connect and disconnect the tool 34 from rack 32 without needing to bend over and place strain on the operator's back. Thus, when tool 34 is lightweight, which refers to weight that when connected to the rack 32 does not raise the center of gravity of the machine by more than about 5%, then the rack 32 may be above the base 30.

In accordance with an aspect of the present disclosure, mower 10 enables an operator to perform lawn maintenance tasks while simultaneously charging supplemental batteries 44 for a supplemental tool 34 carried by the mower 10. One exemplary and non-limiting advantage of mower 10 is the enablement for an operator supported by operator support 16 to maintain a large tract of lawn area that may have a need for a precise maintenance aspect far away from the location where the operator stores mower 10.

For example, an operator may be mowing a long fence line over many acres. When the operator gets to the end of the fence line and is far away from the garage where their tools, such as a weed trimmer, hedge trimmer, edger, or leaf blower are located, the operator is able to step down from the operator support 16 and remove one of the supplemental batteries 44 and perform a precise task such as trimming weeds or edging around fence posts which are significantly remote from the operator's standard gas powered supplemental tools and without the need for physically carrying supplemental tools by the operator and instead placing the tool on the rack 32.

In operation and in accordance with FIG. 2 and the scenario presented immediately above, once the mower 10 is driven to a remote location, such as a fence line extending a significant distance away from the operator's tools, such as a garage, the operator may step down from the support 16. When the operator steps down from the operator support 16, the mower may have a kill switch which turns off engine 12.

However, the supplemental batteries 44 will be fully or substantially charged as the alternator 24 charges supplemental batteries 44 while the mower 10 is performing its ordinary lawn maintenance tasks. The operator may remove one of the supplemental batteries, here depicted generally as 44a. The first supplemental battery 44a may be connected with receptacle 54 of tool 34 after tool 34 has been removed from rack 32 in the direction indicated in FIG. 2. With the first supplemental battery 44a connected to tool 34, the operator may perform a supplemental task such as precision weed trimming or edging or hedge trimming utilizing the electrical DC power of battery 44a to power tool 34.

Regarding the supplemental batteries 44, one having ordinary skill in the art would understand and foresee that various voltage batteries are common in the art with respect to electrically powered tools having rechargeable batteries. Thus, supplemental batteries 44 may be 12 volt, 16 volt, 18 volt, 20 volt, 24 volt, or 48 volt batteries. However, the recharging process performed by alternator 24 is most efficient when the battery 44 voltage is equal to that of the output current from alternator 24. In order to ensure that the battery voltage matches the current output from alternator 24, the stator 28 having wound coils therein, is configured to be interchangeable with other stators having similar mounts but different coil arrangements. The coil arrangement is what determines the amount of voltage output from the alternator 24. Thus, if the supplemental batteries 44 are 12 volt batteries, then the stator 28 is operatively connected to flywheel 26 having a coil arrangement configured to output 12 volts. In other scenarios, if the rechargeable supplemental batteries 44 are 16 volt batteries, the stator 28 may be swapped out with an interchangeable second stator having a second coil arrangement configured to output 16 volts in a direct current manner that matches the current of battery 44. The similar interchangeable stator 28 process may be repeated as many times as necessary, as one having ordinary skill in the art would understand, and continue the recharging process of the supplemental batteries 44 with the stator 28 having a matching coil arrangement that outputs a voltage that matches that of battery 44.

During the method of operation associated with mower 10, the alternator 24 is powered by the engine 12 that is supported by frame 14. The operator positioned on support 16 controls the movement of mower 10 utilizing controls 18. As the mower 10 is moved directionally either in the forward or rear directions, the alternator 24 charges the supplemental batteries 44 contained in base 30 that are connected via terminals 48 in slots 46. After the mower 10 has reached a destination, the operator may step down or otherwise remove themselves from operator support 16 and remove the supplemental tool 34 from rack 32. The supplemental batteries 44 that have been fully or at least substantially charged by the alternator 24 may be removed from a respective slot 46 in order to insert an extension piece into a receptacle 54 on tool 34. The first battery 44a may be removed by being lifted upwardly away from base 30 as indicated by the directional movement arrow identified in FIG. 2.

The extension portion of first battery 44a is then slidably inserted into the receptacle 54 (which may also be referred to as a second slot in the appended claims) on tool 34. The connection of supplemental battery 44a to tool 34 provides an electrical connection with an electrical motor within supplemental tool 34. The operator may then perform a supplemental task distinct from the mower 10 such as weed trimming, edging, or hedge trimming an area that was unable to be attended to by blade 40 of mower 10. After the operator has attended to and performed the supplemental tasks, the supplemental battery 44 may be removed from tool 34 and placed back into the base 30 in order to be recharged as soon as the mower 10 begins moving forward under driven power from engine 12.

One exemplary advantage of providing at least two slots 46 is the enablement of extended supplemental battery 44 usage. Namely, a supplemental battery is more rapidly depleted than the time it takes to charge. Thus, after the operator depletes the first supplemental battery 44a, the operator will use and deplete the second and/or third supplemental batteries. During the time the operator is using and depleting the second and/or third supplemental batteries, the first battery 44a will be charging. The amount of time associated with charging the first supplemental battery 44a should be similar to the depletion time of the second and/or third batteries.

Figure 3:
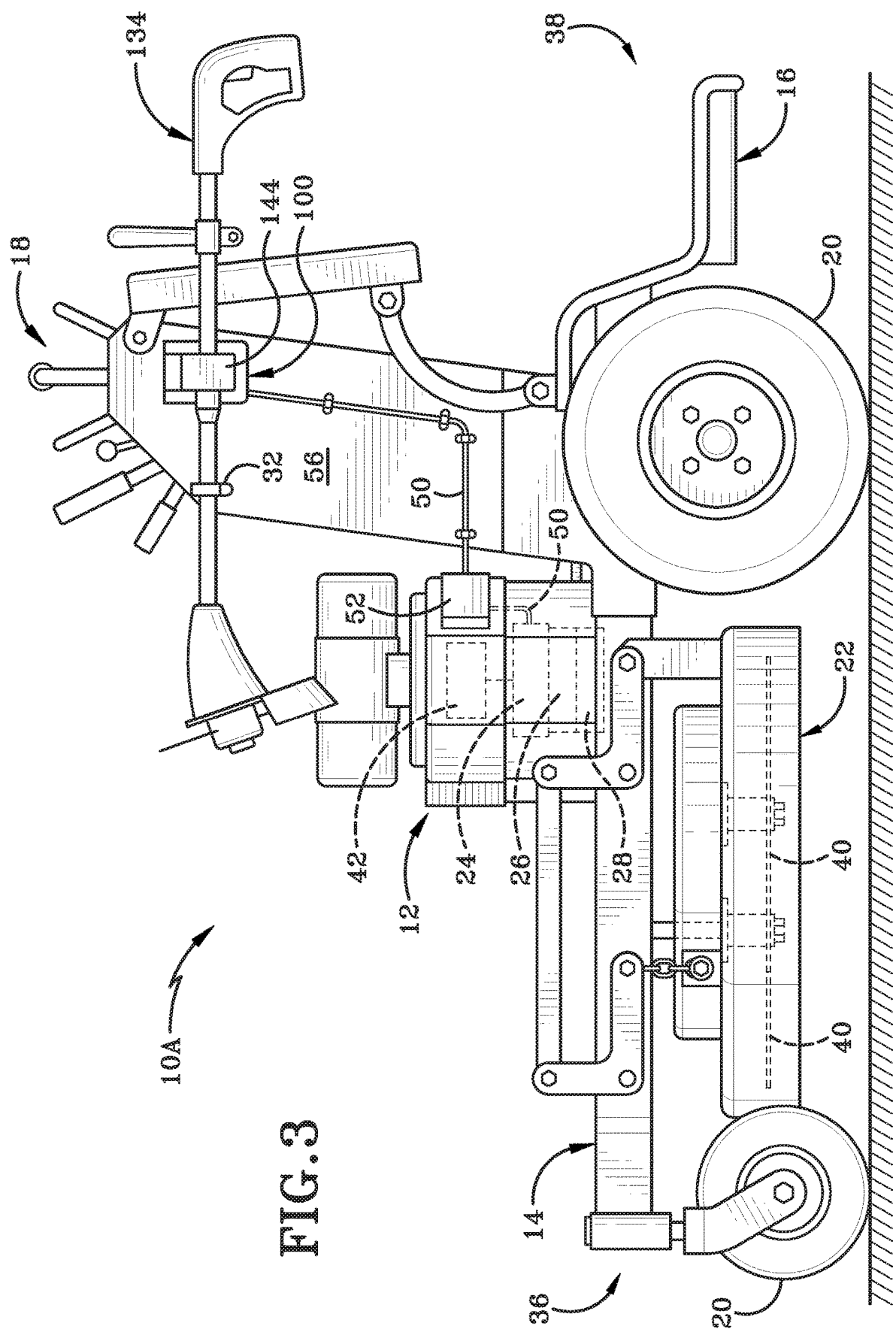
FIG. 3 is a side elevation view of a second embodiment lawn mower include a charging station configured to recharge a supplemental tool having an integrally formed rechargeable battery.

As depicted in FIG. 3, another embodiment may provide mower 10A including a docking station 100 configured to recharge a supplemental lawn maintenance tool 134. Docking station 100 may be mounted on panel 56 adjacent rack 32 or another tool supporting element. Docking station 100 is shaped complementarily to a portion of tool 134 such that tool 134 is supported by docking station 100 when the tool is docked thereto. Docking station 100 is in electrical communication with alternator 24 via line 50.

This embodiment provides a rechargeable battery 144 integrally formed in tool 134. Thus, when tool 134 is supported by the rack 32 and docking station 100, the tool also is slidably received by docking station 100 to recharge the supplemental battery 144 permanently attached to tool 134. The supplemental battery 144 may be recharged in a similar manner such that the supplemental battery is charged as the mower 10A is driven by the operator. While the supplemental battery 144 is shown in FIG. 3 as attached to the tool's shaft, the supplemental battery 144 may equally be permanently housed within the handle or trigger region.

Then, when the operator reaches a remote destination, the tool 134 may be slidably removed from the recharge and docking station 100 and perform the supplemental lawn maintenance task powered by battery 144. The battery may be partially depleted as the supplemental task is completed (i.e., trimming weeds near a fence line or the like). Once the task is completed, the tool 134 carrying battery 144 may be attached to the docking station 100 to recharge the integrally formed supplemental battery 144. The supplemental battery 144 may be of any known voltage described above, and formed of any material, including by way of non-limiting example lithium producing lithium ions. This second embodiment of mower 10A may eliminate the potential for losing supplemental batteries 44 as the mower is driven in accordance with its ordinary usage (i.e., prevent them from falling off the base when the mower is subjected to bumpy terrain).

In operation, and with respect to mower 10A of FIG. 3, a method of use may include the steps of: powering the alternator 24 with the engine 12 supported by the mower frame 14. Then, charging a repeatably removable supplemental battery 144 in a charging station 100 supported by the mower frame 14, wherein the supplemental battery 144 is configured to power a distinct battery powered tool 134 when the tool 134 is removed from the charging station 100. Then, separating the tool 134 from the mower 10A. Then, actuating an element on the tool 134 with an electrical charge from the integrally formed supplemental battery 144 while simultaneously depleting potential energy from the battery 144. Then, reconnecting the tool 134 to the charging station 100. And then, recharging the battery 144 while supported by the changing station 100.

Figure 4:
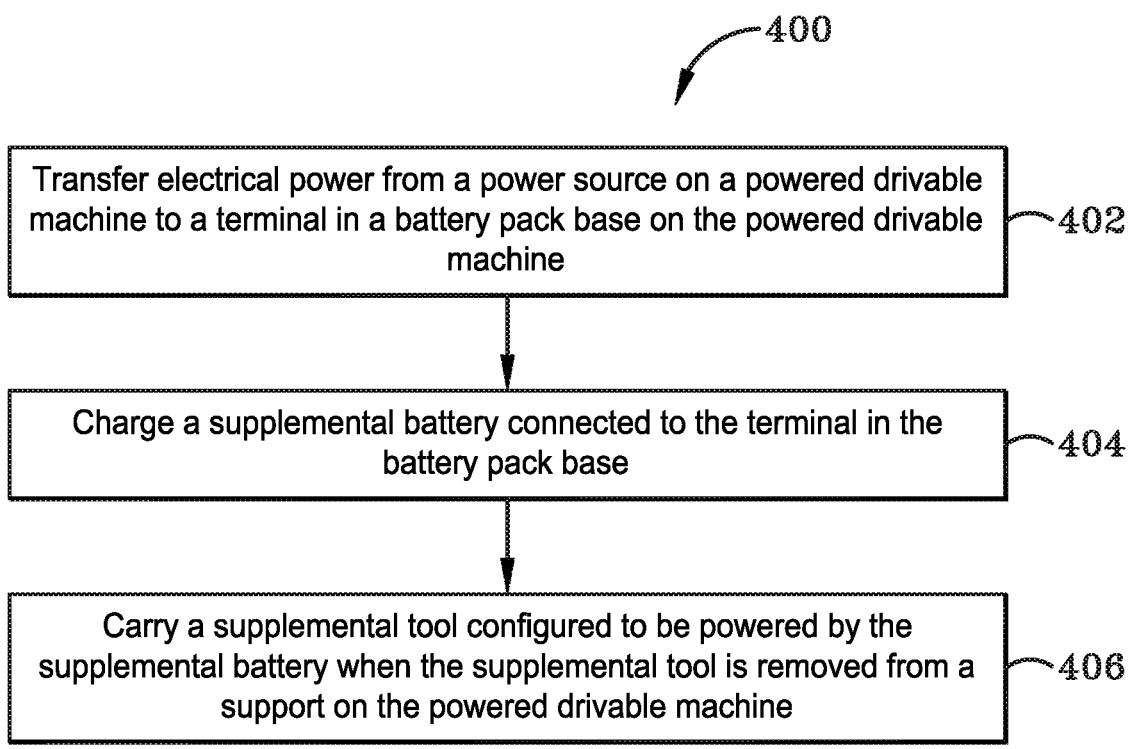
FIG. 4 is a flow chart depicting a method according to an exemplary embodiment of the present disclosure.

FIG. 4 depicts a method according to an exemplary embodiment of the present disclosure generally at 400. Method 400 includes transferring electrical power from a power source on a powered drivable machine to a terminal in a battery pack base on the powered drivable machine, which is shown generally at 402. Method 400 includes charging a supplemental battery connected to the terminal in the battery pack base, which is shown generally at 404. Method 400 includes carrying a supplemental tool configured to be powered by the supplemental battery when the supplemental tool is removed from a support on the powered drivable machine, which is shown generally at 406. In this method 400, at least one of the supplemental tool and the battery pack base is open to the environment.

Figure 5:
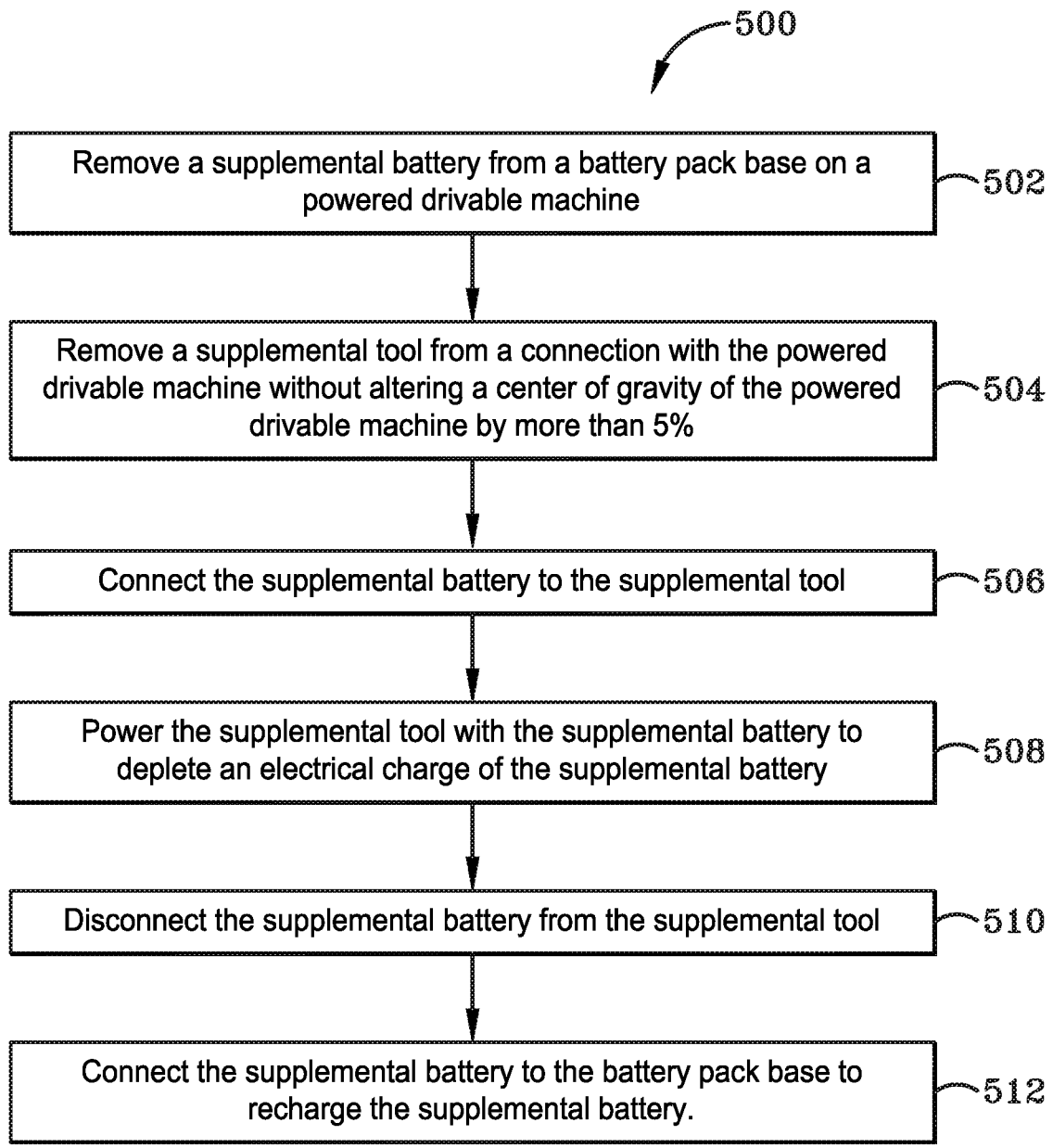
FIG. 5 is a flow chart depicting another method according to another exemplary embodiment of the present disclosure.

FIG. 5 depicts another method according to another exemplary embodiment of the present disclosure generally at 500. Method 500 includes removing a supplemental battery from a battery pack base on a powered drivable machine, which is shown generally at 502. Method 500 includes removing a supplemental tool from a connection with the powered drivable machine without altering a center of gravity of the powered drivable machine by more than 5%, which is shown generally at 504. Method 500 includes connecting the supplemental battery to the supplemental tool, which is shown generally at 506. Method 500 includes powering the supplemental tool with the supplemental battery to deplete an electrical charge of the supplemental battery, which is shown generally at 508. Method 500 includes disconnecting the supplemental battery from the supplemental tool, which is shown generally at 510. Method 500 includes connecting the supplemental battery to the battery pack base to recharge the supplemental battery, which is shown generally at 512.

Figure 6:
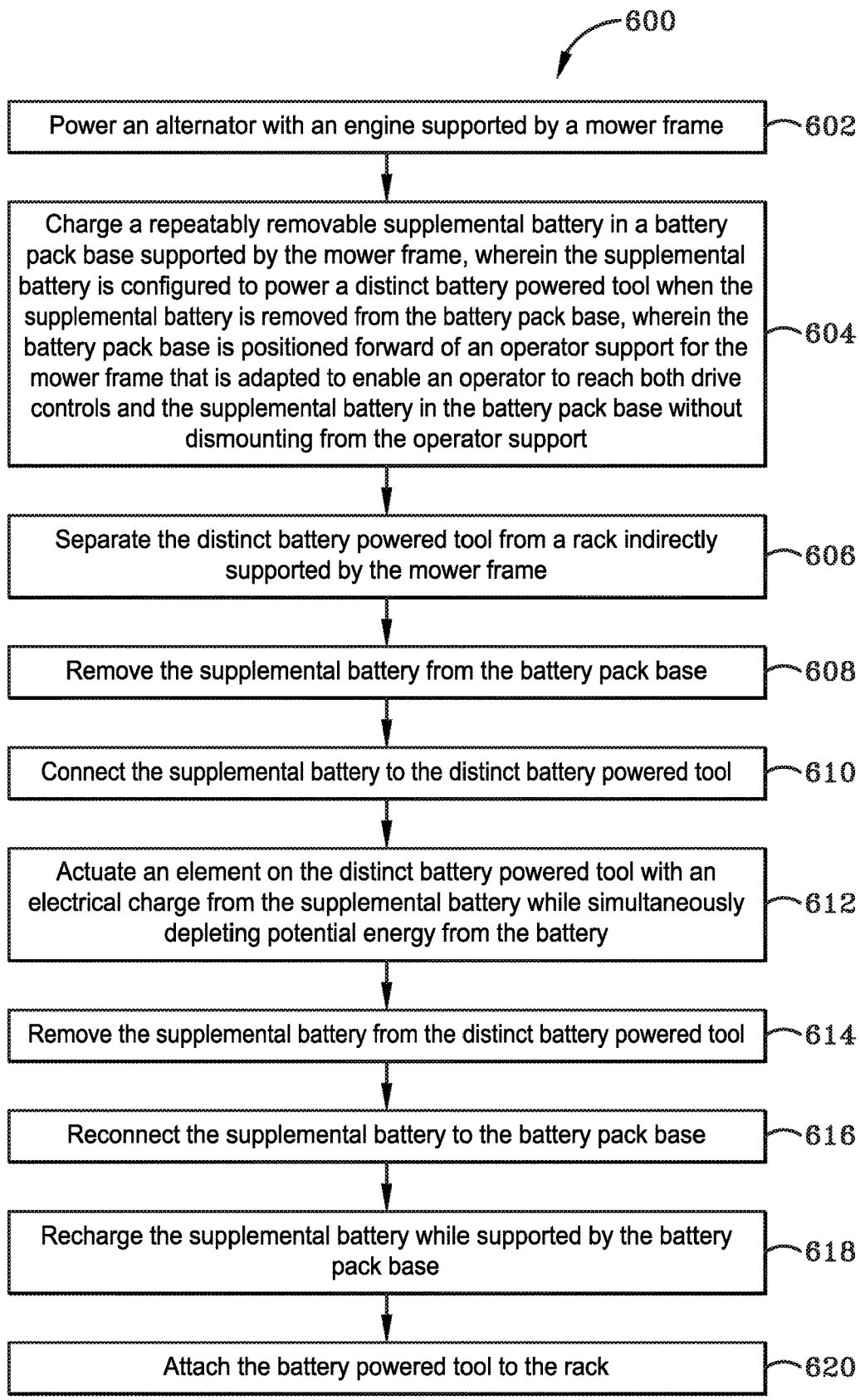
FIG. 6 is a flow chart depicting yet another method according to another exemplary embodiment of the present disclosure.

FIG. 6 depicts yet another method according to another exemplary embodiment of the present disclosure generally at 600. Method 600 includes powering an alternator with an engine supported by a mower frame, which is shown generally at 602. Method 600 includes charging a repeatably removable supplemental battery in a battery pack base supported by the mower frame, wherein the supplemental battery configured to power a distinct battery powered tool when the supplemental battery is removed from the battery pack base, wherein the battery pack base is positioned forward of an operator support for the mower frame that is adapted to enable an operator to reach both drive controls and the supplemental battery in the battery pack base without dismounting from the operator support, which is shown generally at 604. Method 600 includes separating the distinct battery powered tool from a rack indirectly supported by the mower frame, which is shown generally at 606. Method 600 includes removing the supplemental battery from the battery pack base, which is shown generally at 608. Method 600 includes connecting the supplemental battery to the distinct battery powered tool, which is shown generally at 610. Method 600 includes actuating an element on the distinct battery powered tool with an electrical charge from the supplemental battery while simultaneously depleting potential energy from the battery, which is shown generally at 612. Method 600 includes removing the supplemental battery from the distinct battery powered tool, which is shown generally at 614. Method 600 includes reconnecting the supplemental battery to the battery pack base, which is shown generally at 616. Method 600 includes recharging the supplemental battery while supported by the battery pack base, which is shown generally at 618. Method 600 includes attaching the battery powered tool to the rack, which is shown generally at 620.

Additionally, throughout the figures mower 10, 10A has been depicted as stand-on zero turn mower as one having ordinary skill in the art would understand. However, the features of the alternator 24 having a repeatably removable and interchangeable stator 28 may be equally applied to a conventional tractor mower that would have a rechargeable battery base 30 and a rack 32 connected thereto.

An exemplary lawn mower in further accordance with the present disclosure is embodied in U.S. Patent Application Ser. No. 62/610,692 filed on Dec. 27, 2017 entitled "LAWN MOWER FOR POWERING A GARMENT", which is co-owned at the time of filing, and all corresponding non-provisional utility applications claiming priority to the same, are each incorporated in their entirety by reference as if fully re-written herein.

While the embodiments discussed herein and the respective corresponding figures depict the powered drivable machine 10 generally as a mower, it is entirely possible that other types of powered drivable machines may be implemented with the technology for charging a supplemental battery. For example, when the powered drivable machine is embodied as a snow blower or snow thrower, its respective engine would be coupled to a charging station or charging bay on the snow blower/thrower to charge the supplemental battery 44 carried by the same. The supplemental batteries carried by the snow blower/thrower could be used in conjunction with a supplemental tool 34, such as a battery powered, hand held leaf blower, flashlight, cordless drill, radio, and/or a spreader. Further, engine 12 on the snow blower/thrower may also be either an internal combustion engine or a battery powered electric motor.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method comprising:
   transferring electrical power from a power source on a powered drivable machine to a terminal in a battery pack base on the powered drivable machine,
   charging a supplemental battery connected to the terminal in the battery pack base;
   supporting a supplemental tool via a support on the powered drivable machine, wherein the support orients a maximum dimension of the supplemental tool nonparallel to a vertical direction of the powered drivable machine, wherein the supplemental tool includes a battery receptacle sized to receive the supplemental battery, wherein the supplement tool is configured to be powered by the supplemental battery when the supplemental tool is removed from the support on the powered drivable machine and the supplemental battery is connected to the battery receptacle and the powered drivable machine is not moving;
   positioning the supplemental tool on the support with the battery receptacle closer to an operator support than a distal head of the supplemental tool; and
   wherein at least one of the supplemental tool and the battery pack base is open to the environment.

2. The method of claim 1, further comprising:
   transforming the electrical power from a first voltage to a lesser second voltage prior to charging the supplemental battery.

3. The method of claim 1, further comprising:
   maintaining the electrical power within 10% of a output voltage of the power source at the terminal to charge the supplemental battery.

4. The method of claim 1, further comprising:
   carrying the supplemental tool at a location on the powered drivable machine that effects the center of gravity of the machine by less than 5% when the supplemental tool is connected and disconnected from the support on the powered drivable machine.

5. The method of claim 1, further comprising:
   maintaining electrical power at the terminal after the supplemental battery has been removed to enable automatic charging of the supplemental battery when the supplement battery is re-connected to the battery pack base after having been removed and used with a supplemental tool.

6. The method of claim 1, further comprising:
   generating electrical power from a main battery coupled to an electric motor on powered drivable machine.

7. The method of claim 1, further comprising:
   generating electrical power form an alternator coupled to an internal combustion engine on the powered drivable machine.

8. The method of claim 1, further comprising:
   rotating ground engaging wheels and simultaneously charging the supplemental battery.

9. A method comprising:
   removing a supplemental battery from a battery pack base on a powered drivable machine that is not moving;
   removing a supplemental tool from a connection with the powered drivable machine without altering a center of gravity of the powered drivable machine by more than 5%, wherein the connection supports the supplemental tool and orients the supplemental tool in a position in which a maximum dimension of the supplemental tool is nonparallel to a vertical axis of the powered drivable machine, wherein the vertical axis is defined from a bottom to a top of the powered drivable machine;
   connecting the supplemental battery to the supplemental tool;
   powering the supplemental tool with the supplemental battery to deplete an electrical charge of the supplemental battery;
   disconnecting the supplemental battery from the supplemental tool;
   connecting the supplemental battery to the battery pack base to recharge the supplemental battery; and
   reattaching the supplement tool to the connection with the Powered drivable machine without altering the center of gravity of the powered drivable machine by more than 5%, and orienting the maximum dimension of the supplemental tool nonparallel to the vertical axis.

10. The method of claim 9, further comprising:
    driving the powered drivable machine from a first location to a second location;
    releasing control of drive controls of the powered drivable machine;
    grasping the supplemental tool and connecting the supplemental battery to the supplemental tool after removing the supplemental battery from the battery pack base.

11. The method of claim 10, further comprising:

performing a secondary action with the secondary tool remote from the powered drivable machine;

completing, at least a portion of, the secondary action and then disconnecting the supplemental battery from the supplemental tool; and recharging the supplemental battery in the battery pack base after having been at least partially depleted.

12. The method of claim 11, further comprising:

wherein the powered drivable machine is a zero-turn mower;

driving the zero-turn mower and mowing grass while driving the zero-turn mower;

driving the zero-turn mower near a fence line and being unable to mow around individual fence posts;

dismounting the zero-turn mower;

wherein the supplemental tool is a string trimmer;

disconnecting the string trimmer from a rack on the zero-turn mower;

removing one supplemental battery from the battery pack base and connecting the supplemental battery to the string trimmer;

trimming grass around the fence post;

removing the supplemental battery from the string trimmer and connecting the battery back with the battery pack case to recharge the supplemental battery.

13. The method of claim 10, wherein grasping the supplemental tool and connecting the supplemental battery to the supplemental tool after removing the supplemental battery from the battery pack base is accomplished without dismounting from an operator support on the powered drivable machine.

14. The method of claim 9, further comprising:

charging the supplemental battery while moving the powered drivable machine.

15. A method comprising the steps of:

powering an alternator with an engine supported by a mower frame;

charging a repeatably removable supplemental battery in a battery pack base supported by the mower frame, wherein the supplemental battery configured to power a distinct battery powered tool when the supplemental battery is removed from the battery pack base, wherein the battery pack base is positioned forward of an operator support for the mower frame that enables an operator to reach both drive controls and the supplemental battery in the battery pack base without dismounting from the operator support;

supporting the distinct battery powered tool via a rack that orients a maximum dimension of the supplemental tool nonparallel to a vertical direction of the mower frame, and wherein a longitudinal direction is defined from a front end to a rear end of the mower frame having a first dimension measured from the bottom to the top and the maximum dimension of the distinct battery powered tool is less than the first dimension;

separating the distinct battery powered tool from the rack indirectly supported by the mower frame;

removing the supplemental battery from the battery pack base;

connecting the supplemental battery to the distinct battery powered tool;

actuating an element on the distinct battery powered tool with an electrical charge from the supplemental battery while simultaneously depleting potential energy from the supplemental battery;

removing the supplemental battery from the distinct battery powered tool;

reconnecting the supplemental battery to the battery pack base;

recharging the supplemental battery while supported by the battery pack base; and attaching the battery powered tool to the rack.

16. The method of claim 15, wherein prior to the step of powering the alternator includes the steps of:

selecting a stator from a set of interchangeable stators operably connectable to the alternator, wherein each stator in the set has a coil arrangement different from the other stators, wherein the selected stator wound coils determining a voltage output from the alternator, wherein the voltage output corresponds to supplemental battery voltage.

17. The method of claim 15, wherein the step of moving the supplemental battery from the battery pack case is accomplished by lifting the battery upwardly to disengage an extension portion of the supplemental battery from a slidable mating engagement with a slot formed in the battery pack case.

18. The method of claim 17, wherein the step of connecting the supplemental battery to the distinct battery powered tool is accomplished by slidably mating the extension portion of the supplemental battery into a second slot formed in the distinct battery powered tool.

19. The method of claim 15, wherein the step of charging the repeatably removable supplemental battery in the battery pack base is accomplished by sending an electrical current from the alternator to the battery pack base while the engine moves the mower frame.

* * * * *